United States Patent [19]
Bahre

[11] 3,772,780
[45] Nov. 20, 1973

[54] APPARATUS FOR CUTTING METAL SHEATH

[75] Inventor: Werner Bahre, Burgdorf, Germany

[73] Assignee: Kabel-und Metallwerke Gutehoffnungshutte Aktiengesellschaft, Hanover, Germany

[22] Filed: Mar. 2, 1971

[21] Appl. No.: 120,099

Related U.S. Application Data

[63] Continuation-in-part of Ser. No. 725,370, April 30, 1968, abandoned.

[52] U.S. Cl. ................... 30/90.2, 30/90.4, 30/173, 30/254
[51] Int. Cl. ...................... B26b 13/06, B23d 21/06
[58] Field of Search ................ 30/90.2, 90.4, 254, 30/260, 261, 262, 266, 268, 173

[56] References Cited
UNITED STATES PATENTS

| | | | |
|---|---|---|---|
| 1,222,513 | 4/1917 | Aaron | 81/9.5 R |
| 1,662,772 | 3/1928 | Wilkes et al. | 30/260 |
| 1,878,500 | 9/1932 | Lingwood | 30/261 |
| 1,970,983 | 8/1934 | Smith | 30/254 |
| 2,161,152 | 6/1939 | Furrer | 30/90.2 |
| 2,819,523 | 1/1958 | Stoeveken | 30/260 |

*Primary Examiner*—Othell M. Simpson
*Attorney*—Philip G. Hilbert

[57] ABSTRACT

Apparatus for cutting corrugated metal cable sheath including shear means for severing individual corrugated portions transversely thereof and in longitudinal succession, while simultaneously displacing the opposed cut edges inwardly and then separating the cut edges to expose the cable core.

1 Claim, 6 Drawing Figures

INVENTOR.
Werner Bahre

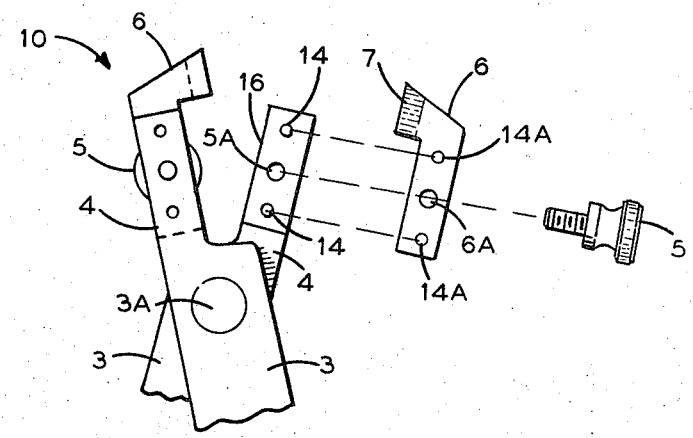
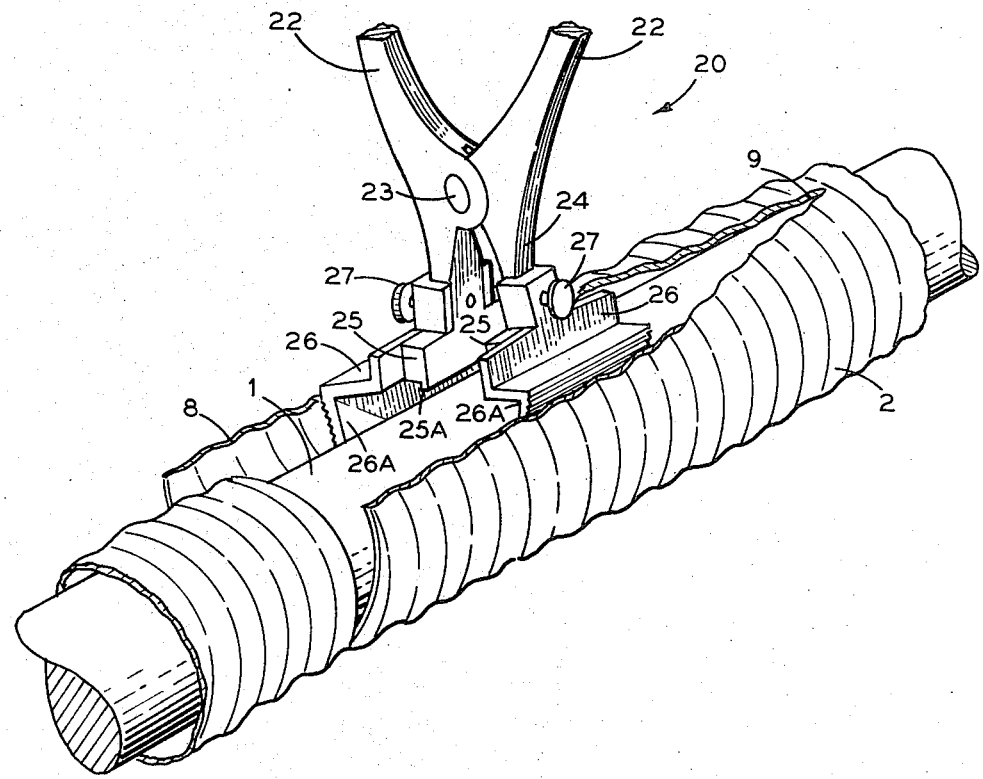

APPARATUS FOR CUTTING METAL SHEATH

This application is a continuation in part of application Ser. No. 725,370, filed Apr. 30, 1968, now abandoned.

BACKGROUND OF THE INVENTION

In known cable constructions, cable sheathing has been provided in the form of metal tape bent into tubular shape about an electrical cable core, the adjacent longitudinal edges of the tubular sheath then being welded to form a longitudinal seam. The tubular sheath is then transversely corrugated to insure flexiblity of the completed cable, as well as protection for the cable core against adverse environmental conditions.

In addition it has been proposed to provide conduit means for the transmission of liquids or gases; which takes the form of concentrically related corrugated tubular members with an annular insulating layer between the members; the members being formed from metal tape bent to tubular form with butt welded edges to form a longitudinal seam and then corrugated.

In the case of either the sheathed electrical cable or the conduit, faults in the same may arise during the laying of the cable or conduit, or in the operation of the same, In such event, portions of the cable sheath or the outer member of the conduit must be removed. For this purpose, shears or cutters have been used which move about the cable sheath or conduit along the crests of the corrugations to cut the same.

Such known devices present a number of difficulties, particularly with cables or conduits of large diameters, and in all cases when the cable or conduit is already laid in the ground, with insufficient space for operation of the cutter means. Other cutter constructions have been suggested, which may be used on corrugated members having a lap welded seam, but can not be used on such members having a butt welded seam.

Accordingly, an object of this invention is to provide improved cutter means for opening a corrugated metal sheathing or conduit in any location thereof, wherein the cutter means cuts longitudinally and successively through each corrugation.

A further object of this invention is to provide cutter means of the character described, which are of the plier type, which will cut indvidual corrugations and simultaneously displace the cut edges inwardly to increase the spacing between the cut edges.

Still another object of this invention is to provide cutter means of the character described, which includes cutter blades effective to cut a corrugated sheath of an electrical cable without adversely affecting the cable core enclosed by the sheath.

Yet another object of this invention is to provide cutter means of the character described wherein the cutter blade portions thereof are arranged to overlap in their closed condition, and such cutter blades have a predetermined angularity effective to provide a combined cutting and wedging action.

Other objects of this invention will in part be obvious and in part hereinafter pointed out.

DESCRIPTION OF THE DRAWINGS

FIG. 3 is a front elevational view showing details of the cutter means;

FIG. 4 is a perspective view showing means for spreading the cut edges of the sheathing;

DESCRIPTION OF THE PREFERRED EMBODIMENTS

As shown in FIGS. 1–3, 10 designates cutter means embodying the invention. The same is in pliers form applicable to a transversely corrugated metal sheathing 2 which encloses an electrical cable core 1.

Figure 5:
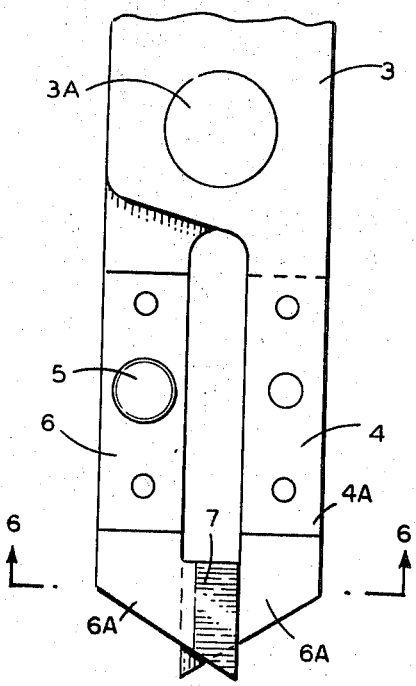
FIG. 5 is a top plan view showing the cutter blades in their closed, overlapping positions.
Figure 6:
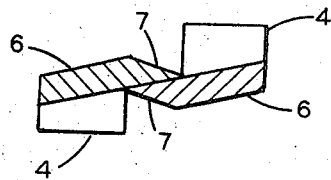
FIG. 6 is a transverse sectional view taken on the line 6—6 of FIG. 5.

Cutter 10 comprises handle portions 3 interpivoted at 3A and outwardly offset jaws 4. Cutter blades 6 are removably mounted on jaws 4 by screws 5. When jaws 4 are in their closed position, the cutting edges of blades 6 are in overlapping relation, see FIG. 5. Jaws 4 are formed with recesses 16 at the outer ends thereof for receiving blades 6 and are provided with short studs 14 receivable in openings 14A, on blades 6 to locate the same in said recesses.

The screws 5 pass through openings 6A in blades 6 and are threaded into threaded openings 5A in recesses 16. The bevelled cutting edge 7 of blades 6 has a cutting angle of at least 28° and preferably 32° with respect to the flat parallel outer surfaces of the blades. Also, the faces of recesses 16 have an inclination of about 12°.

Figure 1:
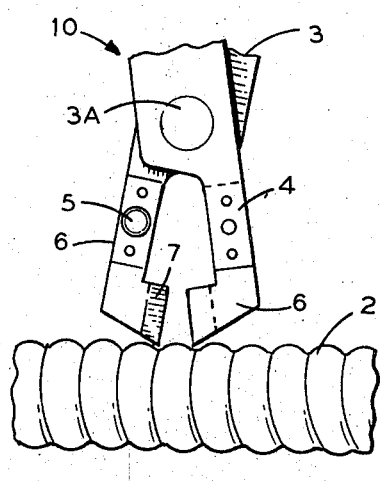
FIG. 1 is a side elevational view showing sheath cutter means embodying the invention, in position to cut a single corrugation of a corrugated metal sheath.
Figure 2:
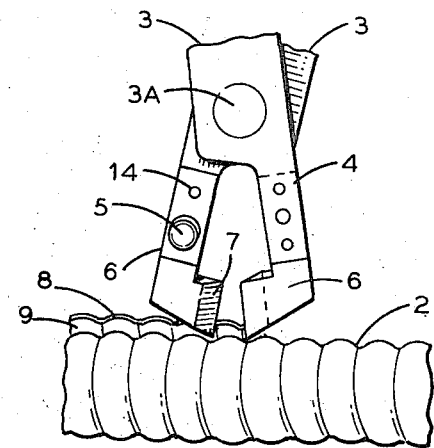
FIG. 2 is a view similar to that of FIG. 1, showing the sheathing with several corrugations cut.

Cutter 10 is used to cut the successive corrugations of sheathing 2, as shown in FIGS. 1, 2; the slit edges 8 forming a longitudinal slit 9. The angular pitch of the blades 6 not only effectively cuts the corrugations, but also turns the edges 8 as they are freshly cut, inwardly to widen the slit and simultaneously break the trough portions of the corrugations. The combination of the overlapping cutting edges and the pitch of the cutting blades insures a smooth cutting and breaking operation; the angle of the cutting blades having a wedge effect which displaces the cut edges apart from each other.

The thickness of the blades 6 in their overlapped cutting position determines the width of slit 9. As blades 6 are replaceable, their thickness and specific cutting angle may be selected to suit any particular cutting operation. The projection of the forward end portions 6A of blades 6 beyond the forward end edges 4A of the jaws 4 should be at least 6 mm.

As shown in FIG. 4, the sheathing edges 8 may be further displaced from each other by spreading pliers 20. Pliers 20 comprise handle portions 22 interpivoted at 23, with jaws 24 extending therefrom. Jaws 24 terminate in transverse bar portions 25 having spreader flanges 25A. For sheathing of large diameters, auxiliary spreader bars 26 may be mounted on jaws 24 and secured in place by screws 27. Bars 26 have depending spreader flange portions 26A which may be roughened on their outer surface portions to provide a better grip on the engaged metal.

After the corrugations of sheath 2 have been cut over the desired length, with concomittant severing of the trough portions of the corrugations; the edges 8 may be further displaced as shown in FIG. 4; the sheathing 2 is then cut circumferentially at the opposite ends of the slit 9, to allow the cut section to be removed as desired.

Cutter means 10 is compact, making it convenient to carry in repair kits and the like; and further, is particularly useful in the case of cables or conduits laid in the ground, since working space requirements are minimal. Also, as the cutter means 10 operates longitudinally of the sheathing, its effectiveness is not impaired if the corrugated sheathing is somewhat deformed. The use of cutter means 10 is not affected by large variations on sheath or conduit diameters.

Cutter means 10 lends itself to a large variety of cable or conduit repair or replacement operations; wherein sheathing or conduit is only opened to expose the cable core or the interior of the conduit; or where a sheathing or conduit portion is to be completely removed.

I claim:

1. In a corrugated cable sheath cutter including a pair of interpivoted handle members movable between open and closed position, each including a handle portion and a blade supporting jaw portion, the combination comprising: means defining a recess in each jaw portion, stud means mounted in said recess, a cutter blade removably mounted on said stud means in each of said recesses and including portions extending longitudinally beyond the extremity of said jaw portion, each cutter blade having a mounting portion and cutting portion, said cutting portion including a pointed extremity for extending into the bottom of the grooves defined by the corrugations, said mounting portion including an opening complementary to said stud and means fastening said blade to said jaw within said recess, said cutting portion of each of said blades including substantially flat parallel top and bottom faces interconnected by an angularly disposed wedging portion terminating in a cutting edge, said cutter blades each carried by said jaws in complementary overlapping cutting and wedging relation with respect to each other and a workpiece with said wedge portions disposed generally transversely to displace the cut cable sheath portions laterally away from each other when said interpivoted members are moved from the open to the closed position.

* * * * *